United States Patent [19]

Zimmer et al.

[11] 3,991,154
[45] Nov. 9, 1976

[54] METHOD OF REPROCESSING FUEL AND/OR BREEDER MATERIAL CONTAINING THORIUM DISSOLVED IN AN ACID SOLUTION

[75] Inventors: Erich Zimmer, Julich, Germany; Octave Coenegracht, Almelo, Netherlands

[73] Assignee: Kernforschungsanlage Julich Gesellschaft mit beschrankter Haftung, Julich, Germany

[22] Filed: Oct. 23, 1973

[21] Appl. No.: 408,803

[30] Foreign Application Priority Data
Oct. 20, 1972 Germany............................ 2251423

[52] U.S. Cl........................................ 423/6; 423/9; 423/10; 423/20
[51] Int. Cl.².......................................... C01G 43/00
[58] Field of Search................................ 423/4, 6–8, 423/10, 20, 9

[56] References Cited
UNITED STATES PATENTS 3,664,964  5/1972  Haney et al.......................... 423/7 X
3,825,649  7/1974  Gresky et al............................. 423/4

Primary Examiner—Edward A. Miller
Attorney, Agent, or Firm—Walter Becker

[57] ABSTRACT

A method of regenerating fuel and/or breeder elements with thorium as breeder material for nuclear reactors. The fuel and/or breeder material is dissolved in an acid such as nitric acid, sulfuric acid or the like and the thus obtained solution is subjected to a liquid-liquid reaction with an extraction substance such as tributyl phosphate dissolved in an organic solvent. The fuel material and breeder material are enriched in the organic phase and the fission products remain in the aqueous phase, whereafter the fuel material and/or breeder material are converted into oxides, carbides etc. Prior to the above mentioned liquid-liquid extraction, the acid solution containing the fuel material and/or breeder material is passed over a sorption column in such a way that the number of mols of adsorbed $^{233}Pa$ per time unit equals the number of mols of $^{233}Pa$ disintegrating per time unit in the sorption column to form $^{233}U$.

3 Claims, No Drawings

METHOD OF REPROCESSING FUEL AND/OR BREEDER MATERIAL CONTAINING THORIUM DISSOLVED IN AN ACID SOLUTION

The present invention relates to a method and a sorption column for regenerating fuel and/or breeder elements for core or nuclear reactors, which elements include thorium as breeder material. The fuel and/or breeder material is dissolved in an acid such as nitric acid, sulphuric acid, or the like, and the solution is subjected to a liquid-liquid reaction with an extraction substance such as tributylphosphate dissolved in an organic solvent. Fuel and/or breeder material is enriched in the organic phase and the fission products remain in the aqueous phase. The fuel and/or breeder materials obtained therefrom as salts are converted into oxides, carbides, or the like.

For the conversion of the thorium introduced into the reactor, the following formula is used. $^{232}$Th $(n,\gamma)$ $^{233}$Th $\beta^-/22.4$ min $^{233}$Pa $\beta^-/27.4$ d $^{233}$U As intermediate member in this disintegration series there is obtained the relatively long-lived $^{233}$Pa. While the quantity of $^{233}$Pa obtained is relatively small, its presence causes difficulties in connection with the regeneration of the fuel and/or breeder elements burned off during their passage through the core reactor. It will be appreciated that in fuel and/or breeder material solutions which are formed for regeneration, approximately half of the total radioactivity is derived from $^{233}$Pa when the elements are colled only for a short period prior to the introduction of the fuel and/or breeder material into the solution. In this instance, the feared disintegration of the rest of the extraction substances utilized during the regeneration occurs. While this drawback can be avoided if, prior to the initiation of the steps for the regeneration, a sufficiently long cooling period of the fuel and/or breeder elements which have to pass through the reactor, is accepted. Since, however, the long waiting periods required in such instances mean the acceptance of high losses in interest, it is necessary to reduce the waiting period as fast as possible in carrying out the regeneration in an economically feasible manner.

In a method heretofore frequently utilized for regenerating fuel and/or breeder elements for core reactors, the fuel and/or breeder materials are dissolved in an acid, for instance in nitric acid, sulphuric acid, hydrochloric acid, or the like, and the solution is then subjected to a liquid-liquid as extraction using, as extractant, amines or tributylphosphate dissolved in an organic solvent such as dodecane. The salts obtained are after separation converted into oxides, carbide, or the like. A further disadvantage of this method is that the $^{223}$Pa is not separated but is found together with the fission products as radioactive waste. This brings about a loss in potential fission material which considerably increases the cost of the process. It has been suggested to take advantage of the strong sorption inclination of the protactinium from acid solution on various known sorbentiums (Sorbenzien) and to separate the $^{233}$Pa from the remaining substances. Thus, it has been suggested, for instance, to sorb $^{233}$Pa in silicagel (Akad. nauk SSR. Trudy Komissil po analiticheskoi khimii. Vol XV, 1965, 369 – 374 East-tr-96).

A further suggestion consists to employ for sorption a glass which is known under the trademark "Vycorglas" and which consists primarily of silicic acid, which has a high specific surface (ORNL-IM-593, 1963). According to these suggestions, the silicagel contained in sorption columns or Vycorglas is loaded with $^{233}$Pa which together with the remaining substances is contained in the acid employed for regenerating the fuel and/or breeder materials. Subsequently, the sorption columns are elutriated by means of an elutriation substance, e.g. by means of oxalic acid dissolved in water. To this end it was necessary, prior to taking the remaining steps for regeneration, to operate the sorption columns alternately. These suggestions have considerable drawbacks because sorption and desorption have to be carried out in a discontinuous manner. A further drawback consists in that for the desorption, the employment of specific chemicals was necessary and that after the desorption, uranium was obtained in a chemical compound, for instance in an oxalic acid solution. Thus it was either impossible, or possible only by additional steps, to use the customarily employed liquid-liquid extraction installation for the necessary separation of the fission products from the fissionable substances and the breeder materials.

It is, therefore, an object of the present invention to provide a method and apparatus by means of which the above mentioned drawbacks can be avoided and which in particular will permit a continuous separation of the $^{233}$Pa from fuel and/or breeder material solutions so that the economy of the regeneration of the thorium containing fuel and/or breeder materials will be greatly increased.

For purposes of realizing this object, the invention starts with the discovery that protactinium from acids, for instance nitric acid solutions, hydrochloric acid solutions, or sulphuric acid solutions, is sorbed on a series of sorbentiums, but the uranium contained in these solutions, is not, and thus the uranium formed during the disintegration of sorbed protactinium will be desorbed by these solutions.

Starting from this discovery, the problem underlying the present invention has been solved by passing the acid solution containing the fuel and/or breeder material, prior to the liquid-liquid extraction, over a sorption column in such a way that the number of mols per time unit of adsorbed $^{233}$Pa, obtained during the conversion of thorium, equals the number of mols of the $^{233}$Pa which disintegrates per time unit in the sorption column to $^{233}$U. A great advantage of the method according to the invention is seen in the fact that sorption of $^{233}$Pa and desorption of the $^{233}$U are made possible by the same solvent and that no further steps have to be taken than the provision of a sorption column.

It has proved particularly advantageous for purposes of practicing the method according to the invention to employ a sorption column which is so dimensioned that its length is expressed by the formula $$L = a \times 1/\rho \times 4/\pi \times D^2 R \times C^o/\lambda \times q_{\infty}$$

in this formula $L$ indicates the length of the sorption column in centimeters; $\rho$ indicates the bulk weight of the sorbent per volume unit in g $\times$ cm$^{-3}$. $D$ stands for the diameter of te sorption column and is expressed in centimeters. $R$ indicates the volume of the acid which contains the fuel and/or breeder material and passes per time unit through the column; $R$ being measured in cm$^3 \times$ min$^{-1}$. $C^o$Pa indicates the $^{233}$Pa concentration in the acid solution prior to the sorption and is expressed in g $\times$ cm$^{-3}$. $\lambda$ Indicates a disintegration constant of $^{233}$Pa and is measured in min$^{-1}$; $q_{oo}$ represents the equilibrium loading of the sorbent with $^{233}$Pa measured in g Pa × g$^{-1}$ of the sorbent. $a$ represents a factor between 1.0 and 1.5.

EXAMPLE

For sorption of the $^{233}$Pa contained in a solution of 40 jato burned off fuel and/or breeder materials, which solution is with regard to the thorium an 0.8 molar nitric acid solution, a sorption column is employed with a bulk weight of 0.743 g/cm$^3$ of the Vycorglas $\rho$, with a diameter D = 21.9 cm, and L = 910cm. A volume of an acid R = 381 cu cm/min containing the fuel and/or breeder material is passed through the column per time unit, with a $^{233}$Pa concentration in the acid solution prior to the sorption C$^o$ Pa of 0.124 × 10$^{-3}$ g/cm$^3$. The predetermined equilibrium load of the Vycorglas with $^{233}$Pa, $q_{oo}$, is 12.3 × 10$^{-3}$ g/g with a disintegration constant $\lambda$ for $^{233}$Pa of 1.76 × 10$^{-5}$/min. The factor $a$ is 1.18. With these conditions, it will be appreciated that the concentration of the $^{233}$Pa lies in the acid solution discharged from the sorption column positively at 1% with regard to the concentration of the solution prior to the sorption.

It is, of course, to be understood that the present invention is by no means limited by the specific example set forth above, but also comprises any modifications within the scope of the appended claims.

What we claim is:

1. In a method of continuously regenerating fuel and breeder elements for nuclear reactors involving Pa-233 and U-233 with thorium as breeder material, which includes the steps of: dissolving at least one of a fuel material and a breeder material in an acid, subjecting the thus obtained solution to a liquid-liqud extraction with an extraction substance dissolved in an organic solvent, thereby enriching said material in the organic phase thereof and retaining the fission products in the aqueous phase, and subsequently obtaining salts therefrom and then converting the salts into at least one of the substances selected from the group consisting of oxides and carbides, the improvement comprising passing the acid prior to the extraction over a single sorption column in such a way that the number of mols [$^{233}$Pa] of adsorbed Pa-233 per time unit equals the number of mols of [$^{233}$Pa] Pa-233 disintegrated simultaneously per time unit in said single sorption column and forming [$^{233}$U] U-233 thereby.

2. A method according to claim 1, in which said acid is selected from the group consisting of nitric acid and sulfuric acid.

3. A method according to claim 1, in which tributylphosphate is used as extraction substance.

* * * * *